United States Patent
Chong, Jr. et al.

(10) Patent No.: US 7,216,150 B2
(45) Date of Patent: *May 8, 2007

(54) APPARATUSES AND METHODS OF PHYSICALLY RESTRICTING ACCESS TO A CONNECTING DEVICE FOR USE WITH A DATA PROCESSING SYSTEM

(75) Inventors: Fay Chong, Jr., Cupertino, CA (US); William L. Grouell, San Ramon, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 917 days.

This patent is subject to a terminal disclaimer.

(21) Appl. No.: 10/325,164

(22) Filed: Dec. 19, 2002

(65) Prior Publication Data

US 2004/0122911 A1 Jun. 24, 2004

(51) Int. Cl.
*G06F 15/16* (2006.01)

(52) U.S. Cl. ..................................................... 709/217
(58) Field of Classification Search ................. 709/217
See application file for complete search history.

(56) References Cited

U.S. PATENT DOCUMENTS

| | | | |
|---|---|---|---|
| 6,070,251 A | 5/2000 | Chong, Jr. |
| 6,098,155 A | 8/2000 | Chong, Jr. |
| 6,370,605 B1 | 4/2002 | Chong, Jr. |

*Primary Examiner*—Zarni Maung
*Assistant Examiner*—Saket Daftuar
(74) *Attorney, Agent, or Firm*—Dorsey & Whitney LLP (57) ABSTRACT

An interconnecting device for a data processing system. The interconnecting device comprises a first plurality of connection ports for connecting to first components of the data processing system. The interconnecting device further comprises a second plurality of connection ports for connecting to second components of the data processing system. And, a cover is affixed over the first plurality of connection ports to restrict access to the first plurality of connection ports.

25 Claims, 8 Drawing Sheets

APPARATUSES AND METHODS OF PHYSICALLY RESTRICTING ACCESS TO A CONNECTING DEVICE FOR USE WITH A DATA PROCESSING SYSTEM

FIELD

The present inventions relates to physically restricting access to a connecting device such as a switch or a hub interconnected to a data processing such as a data storage system or a data storage network.

BACKGROUND

An interconnecting device such as a router, a switch, or a hub is widely used in many data processing systems. For example, in data communication system, a router, a switch, or a hub is used as a communication channel(s) for the exchanges or transfers of data. A router, a switch, or a hub allows for communication within a storage network, a data exchange network, an Internet system, and other data processing systems involving in transferring of data from one location to another location. A router, a switch, or a hub does this by linking or interconnecting one or multiple host data processing systems (or workstations) to one or multiple data storage sources or servers. A router, a switch, or a hub also creates an intelligent connection framework leading to efficient accesses and transfers of stored data.

Figure 1:
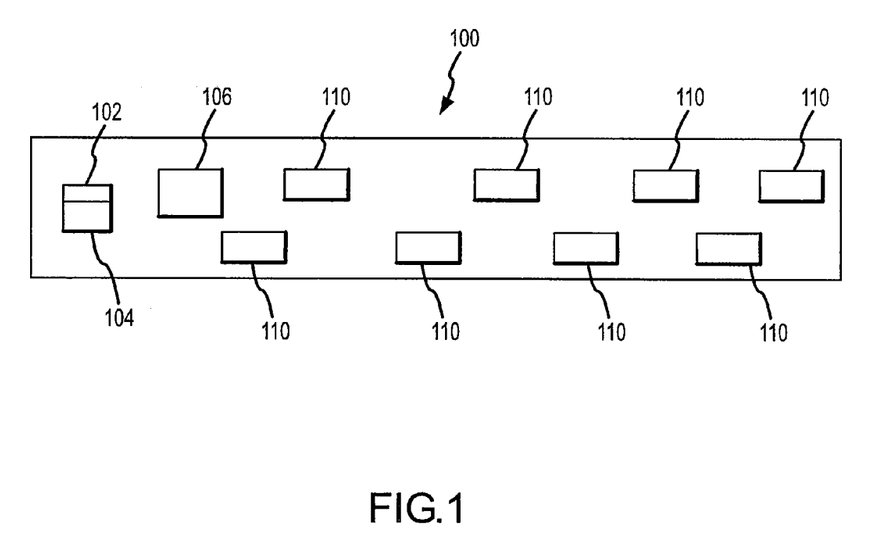
FIG. 1 illustrates an exemplary switch as an example of an interconnecting device.

FIG. 1 illustrates an example of a switch 100 which may be used in a storage network. The switch 100 can be a Fibre Channel (FC) switch in one example. Typically, the switch 100 includes an on/off switch 102, a power connection 104, an Ethernet port 106, and a plurality of switch ports 110. In one example, the switch ports 110 are GBIC (Gigabit Interface Converter) ports. The on/off switch 102 turns the switch 100 on or off. The power connection 104 allows power to be supplied to the switch 100. The Ethernet port 106 allows the switch 100 to interconnect to a service processor or another system for administration of the switch 100. The switch ports 110 allow for host data processing systems (not shown) and data storage systems/servers (not shown) to connect to the switch 100. The switch ports 110 may be hot-pluggable, auto discoverable, and/or capable of self-configuration.

Figure 2:
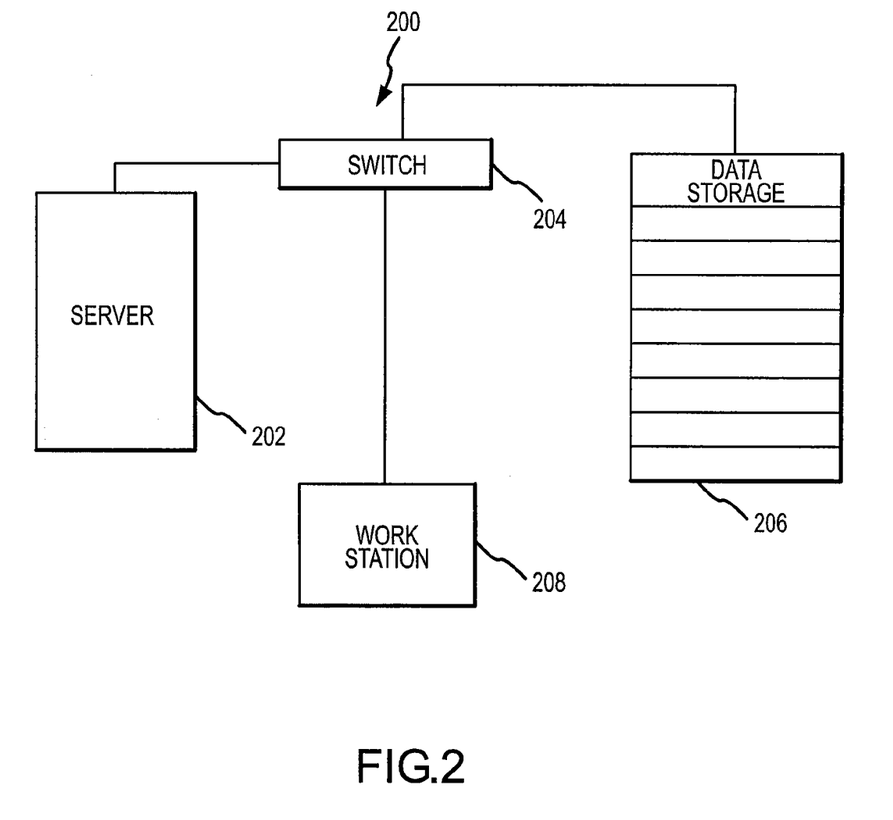
FIG. 2 illustrates a conventional data processing system that includes an interconnecting device such as a switch.

Interconnecting devices such as routers, switches or hubs are usually coupled to other devices. For example, they interconnect with a network system or a data processing system through cables. FIG. 2 illustrates a conventional data processing system 200, which includes a server 202, a switch (or hub) 204, a data storage system 206, and a workstation 208. The switch 204 interconnects with the server 202 via a cable. The workstation 208, which may also interconnect with the switch 204 via a cable, can access the storage system 206 through the switch 204. Through the switch 204, the workstation 208 is also interconnected to the server 202. The server 202 manages the data storage system 206 and allows for data to be transferred between the storage system 206 and the workstation 208. For example, the workstation 208 may send a request to the server 202 via the switch 204 for a particular set of data. The server 202 receives and analyzes the request and sends a request to the data storage 206 via the switch 204 to retrieve the particular data set and send to the workstation 208. Alternatively, the server 202 may request the data storage 206 to send the data to the workstation 208 directly.

In most cases, the switch 204 is the interconnecting device that provides interconnections for all components within the data processing system 200. The switch 204 (or the hub) may comprise a plurality of switch ports similar to the switch ports 110 shown in FIG. 1. Some switch ports are dedicated for connection to the host computers or workstations 208 and some switch ports are dedicated for the data storage systems 206 and the server 202. Often, these switch ports appear identical thus, it is difficult to determine which switch ports are for the workstation 208 and which switch ports are for the data storage systems 206 and the server 202.

In most cases, it is not desirable to allow inadvertent disconnection to certain switch ports. For example, an inadvertent disconnection of the data storage system 206 and the server 202 from the switch 204 may cause disruption or disablement of the data processing system 200. An inadvertent disconnection may be caused by allowing access to all of the switch ports in the switch 204 and/or by having the switch ports appear identical or similar. Also, the switch ports are often interchangeable making it more difficult to distinguish between the ports and their respective connection cables. Currently, markings, colorings, or tapings are affixed or incorporated to the certain switch ports where disconnections are not allowed or where disconnections will cause detrimental effect to the data processing systems. Even with these measures, inadvertent disconnections are not preventable since any one of the connections to the switch could be disconnected at any time and markings/tapings are only warnings that may be missed or ignored.

SUMMARY

It is useful to provide an interconnecting device that allows some connection ports to be physically restricted.

In one exemplary embodiment of the present invention, an interconnecting device for a data processing system is disclosed. The interconnecting device comprises a first plurality of connection ports for connecting to first components of the data processing system. The interconnecting device further comprises a second plurality of connection ports for connecting to second components of the data processing system. And, a cover is placed over the first plurality of connection ports to physically restrict access to the first plurality of connection ports.

In another exemplary embodiment of the present invention, a storage network is disclosed. The storage network comprises an interconnecting device having a first plurality of connection ports and a second plurality of connection ports, wherein a cover is placed over the first plurality of connection ports to physically restrict access to the plurality of connection ports. At least one data storage device is coupled to one of the first plurality of connection ports. Data are transferred between at least one data storage device and at least one workstation via the interconnecting device wherein at least one workstation is connectable to the interconnecting device.

In another exemplary embodiment of the present invention, a storage system is disclosed. The storage system comprises a switch having a first plurality of connection ports and a second plurality of connection ports, wherein a cover is placed over the first plurality of connection ports to physically restrict access to the first plurality of connection ports. A controller is interconnected to one of the first plurality of connection ports. At least one data storage device is interconnected to another of the first plurality of connection ports. At least one workstation is coupled to one of the second plurality of connection ports. The switch is configured to transfer data between the at least one data storage device and the at least one workstation and wherein the controller is configured to manage at least one of the storage of data and the transfer of data within the storage device.

The various embodiments of an interconnecting device which are described here may be used as a switch or a hub in a storage network such as a Storage Area Network (SAN) or as a Network Attached Storage (NAS) system, and the interconnecting device, together with the storage devices which it interconnects to other systems, may be considered a part of the storage network. In this case, the storage devices may be considered to be internal components (within the storage network and managed at least in part by the interconnecting device) and the other systems (e.g., a remotely located client computer system) may be considered external components.

The methods of physically restricting access to an interconnecting device of a data processing system and other exemplary embodiments are also disclosed.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The exemplary embodiments of the present invention pertain to an interconnecting device for use with a data processing system wherein the interconnecting device has connection ports that are physically restricted. The interconnecting device with physically restricted access prevents or makes difficult inadvertent or undesirable disconnection of certain components from the data processing system. In the following description, for purposes of explanation, numerous specific details are set forth in order to provide a thorough understanding of the present invention. It will be evident, however, to one skilled in the art that the present invention may be practiced without these specific details. In other instances, specific apparatus structures and methods have not been described so as not to obscure the present invention. The following description and drawings are illustrative of the invention and are not to be construed as limiting the invention.

Figure 3:
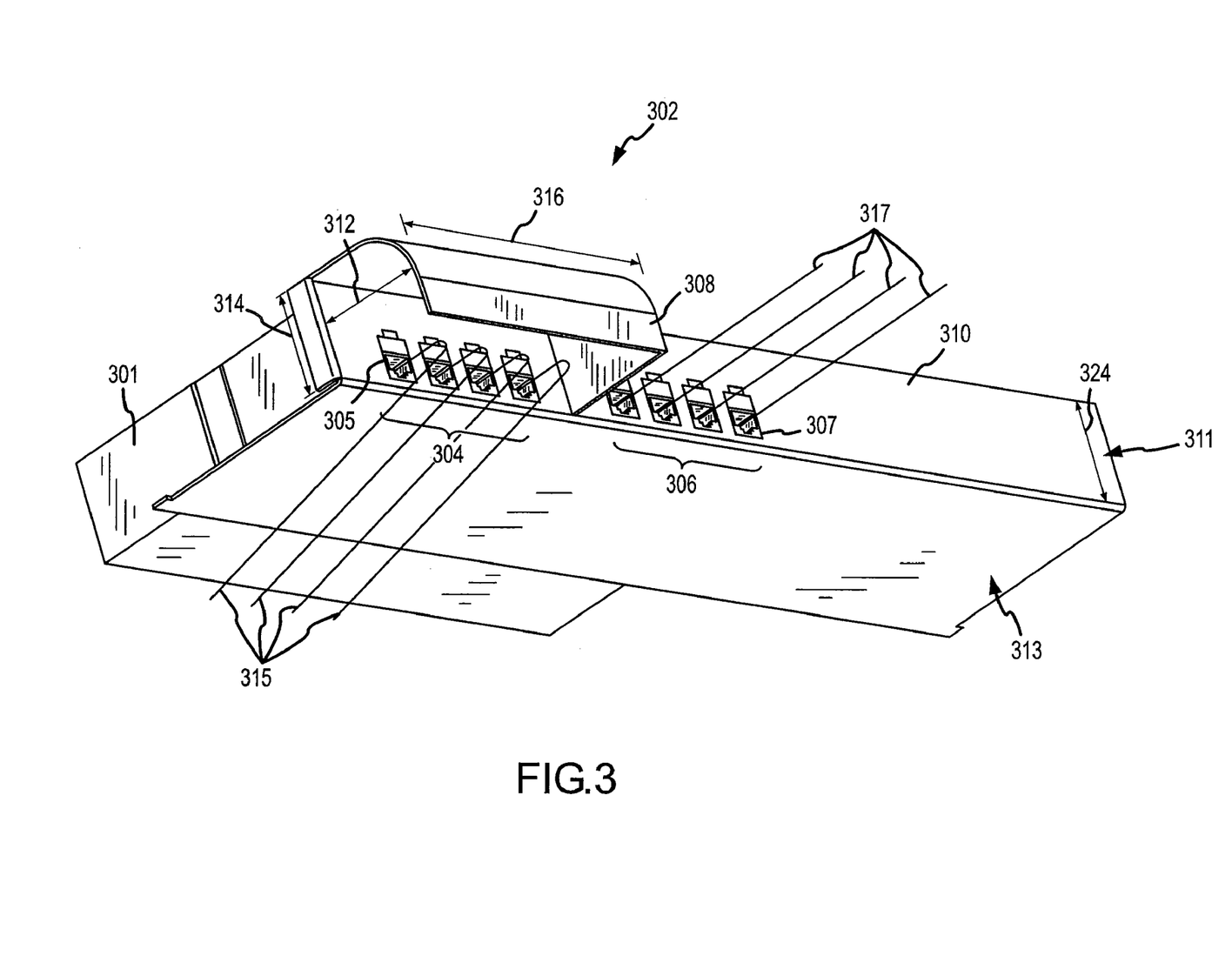
FIGS. 3–4 illustrate an exemplary interconnecting device in accordance with exemplary embodiments of the present invention.
Figure 4:
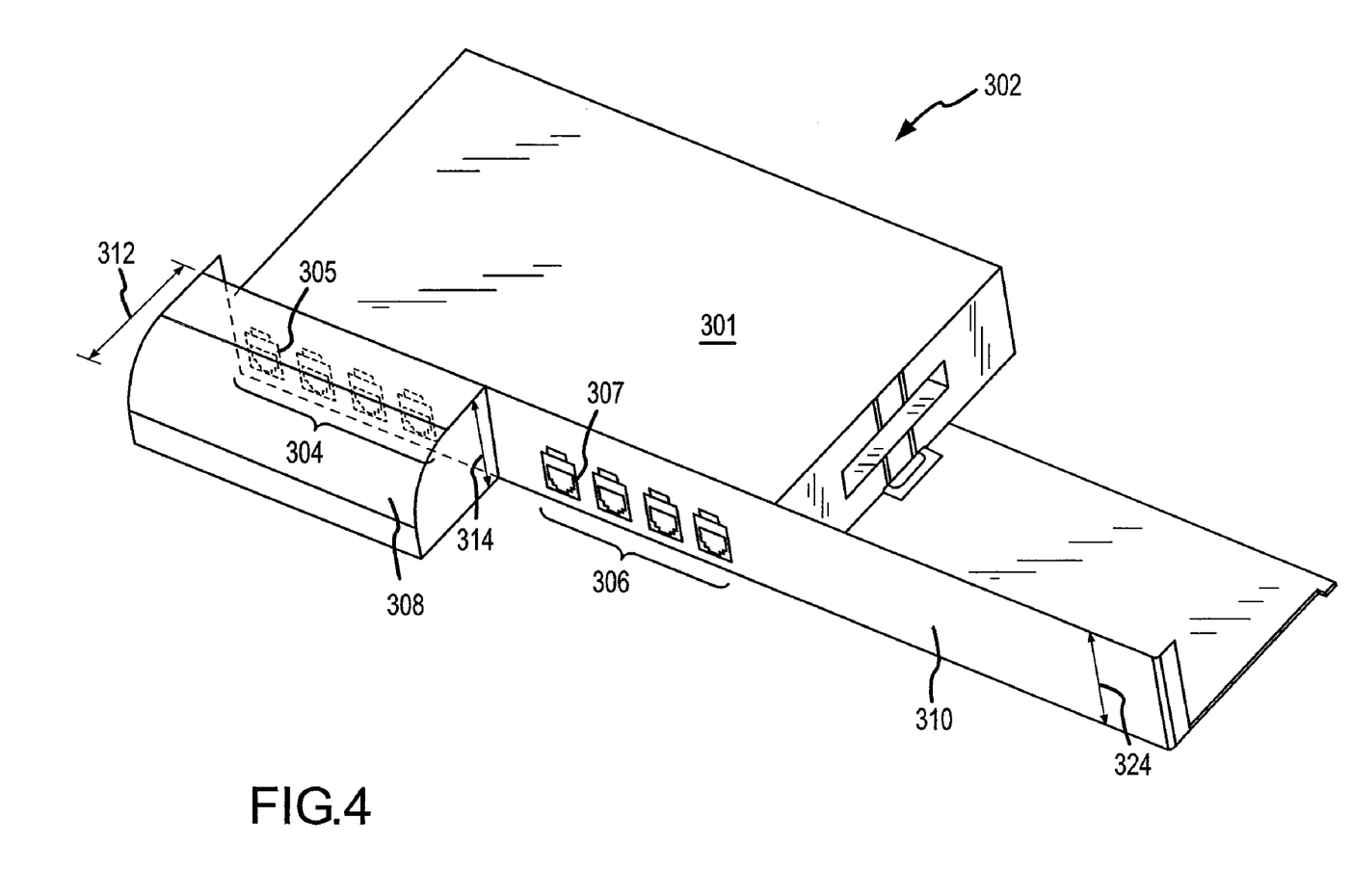

FIG. 3 and FIG. 4 illustrate different views of an exemplary embodiment of an interconnecting device 302 that can be incorporated into a data processing system (e.g., a data storage network, a data storage system, a data storage subsystem or a data storage rack). The interconnecting device 302 comprises a housing 301, a first plurality of connection ports 304 (ports 304), a second plurality of connection ports 306 (ports 306), a cover 308, and an input/output panel 310. The interconnecting device 302 can be a switch, a hub, a Fibre Channel switch, a Fibre Channel hub, a router, a switch router, or other interconnecting device configured or modified in accordance to the exemplary embodiments of the present invention. The ports 304 and 306 can be conventional interconnecting ports such as switch ports, hub ports, and in one embodiment, the ports 304 and 306 are GBIC (GigaBit Interface Converter) ports. The housing 301 encloses all of the necessary electrical components of the interconnecting device 302 as is well known in the art.

In one embodiment, ports 304 and the ports 306 are extended into and located on the input/output panel 310 to provide an easy access or interface to the ports 304 and 306. The ports 304 and 306 are on the same side (and same panel) of the box-like interconnecting device 302. In some embodiments, all connections into the interconnecting device 303 may be on this side/panel. Some or all of the ports from the ports 304 and 306 can be physically restricted. To prevent undesirable or inadvertent disconnections, ports that are dedicated to connection with internal or important components of the data processing system should be physically restricted. Physically restricting the ports indicates that the physical accesses to the ports are restricted, prevented or made difficult thereby preventing one from simply reaching the ports and accessing the ports. Alternatively, physically restricting the ports makes access to the ports difficult such that inadvertent disconnection is not easy.

In one embodiment, the ports 304, which are those reserved for connections with the internal components are physically restricted. The ports 306 are not physically restricted, thus, they are exposed for easy of connection. To physically restrict access to the connection ports on the interconnecting device 302, the cover 308 is affixed or placed over the ports 304. The cover 308 does not electrically restrict access to the first plurality of connection ports 304 thus, allowing for change in the internal connections whenever necessary. The cover 308 prevents inadvertent (or makes difficult) disconnection of the connections between the internal components and the ports 304. For instance, to access the ports 304, one must go behind or underneath the cover 308 to get to the ports 304. Alternatively, to access the ports 304, one must detach, remove, or decouple the cover 308 (if that is allowed as configured by the manufacturer of the interconnecting device 302).

The interconnecting device 302 with the cover 308 enables the manufacturers of the data processing systems that incorporate/integrate the interconnecting device 302 to control which components of the data processing systems can be disconnected and which cannot be disconnected. For example, those components that should not be easily disconnected are connected to the interconnecting device through the ports 304 which are physically restricted by the cover 308. And, those components that can be replaced, exchanged, or otherwise disconnected without affecting major functions of the data processing system are connected to the interconnecting device through the ports 306 that are exposed. Additionally, the interconnecting device 302 with the cover 308 allows the manufacturers of the data processing systems to create easy access for the client data processing systems (or host data processing systems) to be connected to these data processing systems (e.g., via the ports 306 that are exposed) while restricting access to connections of the internal components of other essential components that should not be disconnected from these data processing systems with the cover 308.

Internal components and/or external components of the data processing system that incorporates/integrates the interconnecting device 302 can be connected to either the ports 304 or 306. In one embodiment, the internal components are connected to the interconnecting device 302 through the ports 304 and the external components are connected to the interconnecting device 302 through the ports 306.

Internal components can be referred to as components of the data processing system that are enclosed within a housing (e.g., a rack, a bay, or a cabinet) that contains the data processing system. The internal components can also be referred to as components that are the core or essential components of the data processing system. For example, when the data processing system is a data storage network, the internal components may be referred to data storage devices, data storage servers, or data storage switch systems where data are stored. Additionally, the internal components may be referred to a server that manages the data processing system. Alternatively, when the data processing system is a data storage rack, the internal components may be referred to as data storage devices contained within the rack/bay/cabinet that physically contains the data processing system. Additionally, the internal components may be referred to a controller or a storage controller that manages the data storage rack. The data processing system can also be a computer subsystem of a larger network data processing system wherein multiple subsystems are interconnected to form the network computer. Here, the internal components for each subsystem are referred to components that are contained within the housing that is used to physically contain a particular subsystem. In a larger network type of data processing system, internal components may be components that are essential or necessary for the data processing system to function properly, for example, a central server, a controller, a data storage device, which is connected to the data processing system. It is to be appreciated that the data processing system can be an open system and need not be contained within a housing.

External components are typically host data processing systems, workstations, client data processing systems, or other components that are external to the data processing system or the subsystem. External components can also be referred to as components that reside outside of the main housing that stores most components of the data processing system. External components can also be referred to as components that are remotely located client computer systems. For example, when the data processing system is a data storage network with several computer subsystems, external components are those components that reside outside of each subsystem. In some cases, external components can be an additional data storage device externally connectable to the data processing system or the subsystem, for example, as in embodiments where the data storage devices can be expanded or added to the data processing system externally.

In one embodiment, the internal components are components that are connected to the data processing system in a permanent or substantially permanent fashion whereas the external components are components that are connected to the data processing system in a non-permanent or in an interchangeable fashion.

In one embodiment, the ports 304 are reserved for internal components of the data processing system to connect to the interconnecting device 302. The ports 306 are reserved for external components of the data processing system to connect to the interconnecting device 302. Alternatively, the ports 304 are reserved for components that are permanently or substantially permanently connected to the interconnecting device 302. The ports 306 are reserved for components that are not permanently or substantially permanently connected to the interconnecting device 302. In one embodiment, the internal connections are reserved for components that are connected to the interconnecting device 302 substantially permanently or in a way that disconnection requires a special access to the data processing system. The external connections to the interconnecting device 302 are reserved for components that can be interchanged, replaced, changed, or otherwise disconnected. For example, connections from host data processing systems, workstations, or client data processing systems that need to access the data processing system are considered external components. These computers can be changed without affecting the functions of the data processing system.

The input/output panel 310 allows for easy connections to the interconnecting device 302. Without the input/output panel 310, wires, cables, or connection lines need to be extended from the interconnecting device 302 to the outside of the interconnecting device 302 to allow for connections to the device 302. Then, an input/output panel would need to be attached to the data processing system, typically, on the surface of the data processing system where the interconnecting device 302 would be coupled to in order to allow external components to connect to the interconnecting device 302. Including the input/output panel 310 directly on the interconnecting device 302 allows the external and/or internal components to connect directly to the interconnecting device 302 without the need for additional wirings or cables. As shown in FIG. 3 and FIG. 4, the input/output panel 310 also includes a plurality of receptacles or jacks 305 and 307, which act as interfaces for the ports 304 and 306, respectively. The internal or external components are equipped with cables having mating plugs or connectors that can be plugged into the jacks 305 and 307 to establish connections from these components to the interconnecting device 302.

In one embodiment, the cover 308 is coupled or is attached to the input/output panel 310. The cover 308 can be created or made separately and then be placed, adhered, or coupled to the input/output panel 310 using conventional methods (e.g., by using adhesive or mechanical connections). In one embodiment, the cover 308 can be permanently affixed to the input/output panel 310. In another embodiment, the cover 308 may be coupled to the input/output panel 310 in a way that allows the cover 308 to be removed if necessary. In yet another embodiment, the cover 308 may also be coupled in a way that allows the cover 308 to slide from one side of the input/output panel 310 to the other side. This is especially useful when the cover 308 needs to physically restrict access to different ports, for example, the ports 306. In this embodiment, the cover 308 may slide over to the ports where restriction to access is necessary. Also in this embodiment, the cover 308 should be provided with a locking mechanism to allow the cover 308 to be locked into position relative to the input/output panel 310. In yet another embodiment, the cover 308 is an extension of the input/output panel 310 and can be created at the same time and out of the same piece of starting material with the input/output panel 310.

The cover 308 has a dimension that is sufficient to physically restrict external access to the first plurality of connection ports 304. In other words, the cover 308 is sufficiently dimensioned to cover or substantially cover all of the ports 304. In one embodiment, the cover 308 has a height 314 and a length 316. The height 314 can be (but need not be) the same as the height 324 of the input/output panel 310. The length 316 is sufficiently long to cover all of the first plurality of connection ports 304 that are reserved for internal connections. The cover 308 also has a width 312 that is sufficiently large to accommodate the necessary turning or bending of the cables that are used for connections to the first plurality of connections ports 304. It is to be appreciated that restricting the port 304 is only an example of how the cover 308 may be used to physically restrict access to a particular set of ports. The cover 308 can be used to physically restrict access to other ports as necessary, for example the ports 306. Alternatively, the cover 308 may also be used to physically restrict some ports from the first plurality of connections ports 304 and some ports from the second plurality of connections ports 306. Thus, the cover 308 is to be placed over the area that includes the ports that need to be physically restricted.

In one embodiment, the width 312 is sufficiently large to accommodate a minimum clearance space that a plurality of Fibre Channel cables would need to have for these cables to function properly. In one embodiment, the Fibre Channel cables are of the types that have bending radii of about 25–150 mm. In this embodiment, the width 312 would be dimensioned at about 50–80 mm to allow for the bending of the Fibre Channel cables. In other embodiments, the width 312 is sufficiently large to allow for bending of the Fibre Channel cables without damaging the Fibre Channel cables.

In one embodiment, both the external components and the internal components connect to the interconnecting device 302 from one side of the interconnecting device 302 as shown in FIG. 3. In this embodiment, the ports 304 and the ports 306 are located on the same side, side 311, of the interconnecting device 302. In one embodiment, the side 311 is the side facing the front of the data processing system. In another embodiment, the side 311 is the side facing the back of the data processing system. In yet another embodiment, the side 311 faces the external environment of the data processing system.

In one embodiment, as shown in FIG. 3, the external components connect to the jacks 307 using cables 317 with no need for bending in the cables 317. The internal components connect to the ports 304 directly into the jacks 305 using cables 315 in a bent fashion, for example, in a 90-degree angle or in a 180-degree angle. In this embodiment, the internal components are placed or situated behind the side 311 of the interconnecting device 302 thus, turning or bending of the cables 315 is necessary to reach the internal components. And, as shown in this figure, the cables 315 are bent around the side 313 of the interconnecting device 302. A minimum clearance space is provided (through the width 312) for the cables 315 to bend around the interconnecting device 302 to prevent damages or interferences to the functions of the cables 315. In one embodiment, the cables 315 and 317 are Fibre Channel cables and the minimum clearance space provided is sufficient to accommodate for the bending radii of these Fibre Channel cables.

In one embodiment, accesses to the ports 304 are restricted after the internal connections to the ports 304 are made. In the embodiment where the internal components include at least one of the data storage systems and data storage system controllers, connections from the interconnecting device 302 to these internal components via the ports 304 and the cables 315 are made before the cover 308 is affixed to the input/output panel 310 to prevent physical access to the ports 304.

In another embodiment, the interconnecting device 302 is configured with the cover 308 prior to the connection of the interconnecting device 302 to the internal components. In the embodiment where the internal components include at least one of the data storage systems and data storage system controllers, the cables 315 from the internal components can be plugged into the jacks 305 from underneath the interconnecting device 302.

Figure 5:
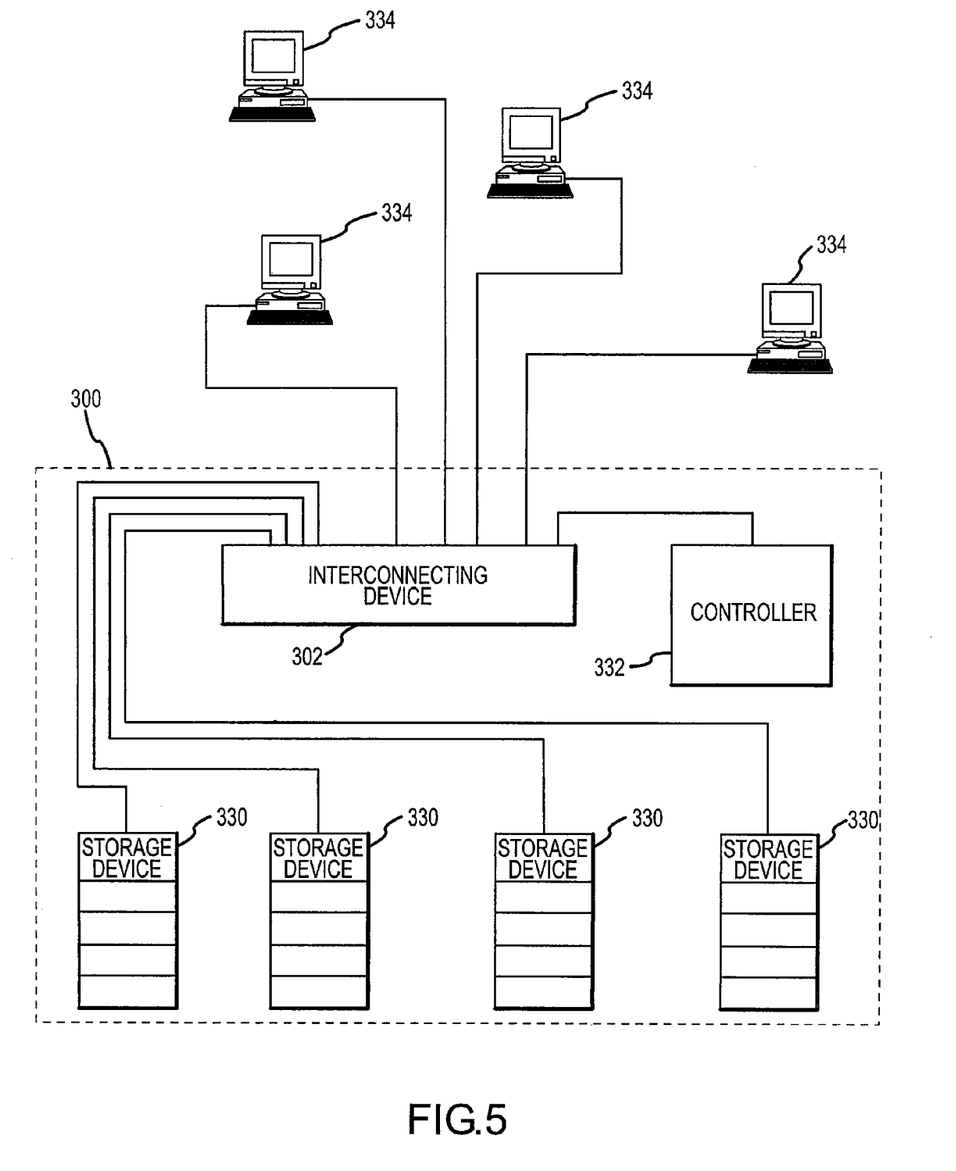
FIG. 5 illustrates an exemplary data processing system that incorporates an exemplary interconnecting device in accordance with exemplary embodiments of the present invention.

In one exemplary embodiment, FIG. 5 illustrates a data processing system 300 that incorporates or integrates an interconnecting device 302 that has connections wherein some of which are physically restricted as previously described. The data processing system 300 can be a data storage system, a data storage rack, a data storage network, or other data processing systems involving in data transfers. The data processing system 300 comprises at least one data storage device 330, and as illustrated in FIG. 5, four data storage devices 330 are included. In one embodiment, the data processing system 300 also includes a controller 332, which manages data transfers within and/or from the data processing system 300. The data processing system 300 comprises an interconnecting device 302 as previously described. The interconnecting device 302 allows for host computers or workstations 334 to connect to the data processing system 300. Additionally, the interconnecting device 302 also allows for other external components of the data processing system 300 (e.g., another data storage device, not shown), to be connected to the data processing system 300. The interconnecting device 302 also allows for internal components of the data processing system 300 (e.g., the data storage device 330 and the controller 332) to be connected to the data processing system 300.

As described above, the interconnecting device 302 includes the ports 304 which are reserved for internal connections and the ports 306 which are reserved for external connections. In one embodiment, each of the data storage devices 330 is coupled to one of the ports 304 of the interconnecting device 302. Each of the workstations 334 is coupled to one of the ports 306 of the interconnecting device 302. And, the controller 302 is connected to one of the ports 304. Data is transferred between at least one data storage system 330 and at least one workstation 334 via the interconnecting device 302. The controller 332 manages the data transfers between the workstation 334 and the data storage device 330.

In one embodiment, the interconnecting device 302 allows for communication channels to be established between the data storage device 330 and the workstations 334. Accesses to the connections for the internal components such as the data storage device 330 and the controller 332 are physically restricted by the cover 308 (see FIG. 3) placed over the ports 304 so that inadvertent disconnection of the data storage devices 330 and/or the controller 332 is prevented or at least made difficult. One reason for this is that disruption to the internal connection (e.g., connections with the data storage devices 330 and the controller 332) may cause disruption to the function of the data processing system 300. For example, inadvertent disconnection of the data storage device 330 or the controller 332 while data is being transferred from either one of these components to any one of the workstation 334 will cause disruption to the data transfer or the data processing system 300.

In one embodiment, connections from the workstations 334 to the interconnecting device 302 can be flexible or interchangeable. For example, one workstation 334 can replace another workstation 334. Alternatively, another external components (e.g., an additional data storage device) can replace a workstation 334. Connections for external components thus, should be easily accessible. In one embodiment, connection from the controller 332 to the interconnecting device 302 is made to be permanent or substantially permanent. Additionally, connections for the data storage device 330 to the interconnecting device 302 are permanent or substantially permanent. In the embodiment where the interconnecting device 302 has all of the ports 304 and 306 on one side, accesses to the connections from the internal components are physically restricted by the cover 308 to prevent inadvertent disconnection of the internal components of the data processing system 300 (e.g., the data storage device 330 and the controller 332).

The interconnecting device 302 transmits command packets between the workstations 334, the data storage devices 330, and the controller 332. In one embodiment, a particular workstation 334 makes a request for a particular data set from a particular data storage device 330. The workstation 334 sends a command packet to the controller 332 via the interconnecting device 302, which transmits the command packet to the controller 332. Upon analyzing and/or translating of the command packet, the controller 332 routes the command packet to the appropriate data storage device 330. The controller 332 may determine the appropriate data storage device 330 that stores the particular data set that the particular workstation 334 requests and routes the request to that particular data storage device 330. In one embodiment, the controller 332 generates another command packet and sends it to the data storage device 330 in accordance to the command packet sent by the workstation 334. Data is then retrieved from the data storage device 330 and sent to the workstation 334 via the interconnecting device 302. The data can be routed directly to the workstation 334 via the interconnecting device 302 or can be routed back to the controller 332 which will then transmit the data to the appropriate workstation 334. It is to be appreciated that there are several ways of transferring data to the appropriate destination. For instance, in some embodiments, a controller 332 is not needed to manage the data transfer. Instead, the interconnecting device 302 can include a processor that can manage the data transfers from and to the interconnecting device 302. In one embodiment, data transfers are performed according to the methods described in the U.S. Pat No. 6,370,605 which is herein incorporated by reference.

In one embodiment, the interconnecting device 302 is one of the switches disclosed in the U.S. Pat. Nos. 6,370, 605 and 6,070,251, which are hereby incorporated by reference.

In one embodiment, the interconnecting device 302 includes a CPU (Central Processing Unit) (not shown) and a memory. A communication bus is coupled to the CPU. And, a memory bus couples the CPU to the memory. The memory stores data routing information (e.g., as generated by the controller 332). The interconnecting device 302 uses the data routing information to route data directly between the workstations 334 and the data storage devices 330. In one embodiment, data need not be routed back to the controller 322 before it is routed to the appropriate workstations 334. The controller 332 may include instructions in the command packet sent to the data storage device 330 to instruct the data storage device 330 to retrieve the particular data set and send it directly to the particular workstation 334 that requests for the particular data set. Many well known protocols can be used for the data transfer within, to, and from the data processing system 300. In one embodiment, a Fibre Channel protocol well known in the art is implemented for the transfer of data within, to, and from the data processing system 300. In another embodiment, a SCSI (Small Computer System Interface) well known in the art is implemented for the transfer of data within, to, and from the data processing system 300.

In one embodiment, the controller 332 manages the data processing system 300. The controller 332 can be enclosed within the data processing system 300, for example, as in an embodiment where the data processing system 300 is contained in a housing (e.g., rack, bay, or cabinet). Alternatively, the controller 332 can be external to the data processing system 300 as in an embodiment where data processing system 300 is a subset of a larger data storage network. The controller 332 can also be a server that is included within the data processing system 300 as in an embodiment where the data processing system 300 is a large data storage network operated over the Internet. The controller 332 is capable of managing data transfer and/or retrievals between the workstations 334 and the data storage systems 330 and within the data processing system 300. The controller 332 can receive and/or send command, status, or data packets from either the workstations 334 or the data storage devices 330. The controller 332 can also translate command, status, or data packets sent from the workstations 334 wherein the packets may make requests for data from any of the data storage devices 330. The controller 332 can also transmit the packets from the workstations 334 to appropriate data storage devices 330 either as identified by the workstations 334 or by the controller 332 performing analysis of the requests. The controller 332 can also transmit a command, status, or data packets from the data storage device 330 to any particular workstation 334 as destination.

In one embodiment, the data processing system 300 does not include the controller 332. Data transfer can be performed directly between the workstations 334 and the data storage devices 330. In this embodiment, the interconnecting device 302 is configured to be able to manage the data transfers for the data processing system 300.

In one embodiment, the controller 322 is one of the controllers disclosed in the U.S. Pat. Nos. 6,370, 605 and 6,070,251, which are hereby incorporated by reference.

The workstations 334 are host data processing systems, servers, or stand-alone computers that need access to the data processing system 300. Alternatively, the workstations 334 can be client data processing systems that subscribe to the data service of the data processing system 300.

In one embodiment, the connection ports 304 and 306 are Fibre Channel ports. As is known in the art, a Fibre Channel port simply manages a point-to-point connection between itself and the Fibre channel fabric (here, the interconnecting device 302). Fibre channel is a high performance serial link supporting its own, as well as other higher level protocols such as FDDI (Fibre Distributed Data Interface), SCSI, HIPPI, IPI (Intelligent Peripheral Interface), etc. Fibre channel typically provides control and complete error checking over the Fibre channel link. A Fibre channel link includes two unidirectional Fibres transmitting in opposite directions with their associated transmitter and receiver. Each Fibre is attached to a transmitter of a port at one end and a receiver of another port at the other end. A Fibre channel may operate at a variety of speeds, for example, 1 Gbits/s, 2 Gbits/s, 4 Gbits/s, 10 Gbits/s, etc. Fibre channel transmission distances vary depending on the combination of Fibre Channel speed and the Fibre media (electrical or optical).

Fibre channel has two parties: (1) An originator or an initiator port, and (2) A responder or a target port. The initiator sends the command to the target. The target decodes the command and data is transferred to or from the initiator depending on the command. After the completion of data transfer, the target sends status information to the initiator. The status information indicates the status (i.e., valid data transfer, error during data transfer, etc.) of the corresponding data transfer operation initiated by the initiator.

In one embodiment, the initiator (a workstation 334) sends commands to the target (the controller 332), and the data is transferred directly between the data storage device 330 and the workstation 334. In this embodiment, the interconnecting device 302 is configured with added capabilities. One of the most important capabilities is to be able to redirect the Fibre channel data as required by the Fibre channel protocol. In one embodiment, additional hardware is added to the interconnecting device 302 to replace a destination field in a data packet received from the data storage device 330 with the node address of the workstation 334. This effectively converts storage device data packets into controller data packets as required by the Fibre protocol for communication between the workstation 334 and the controller 332. A detailed explanation of data redirection over Fibre channel may be found in the U.S. Pat. No. 6,098,155, which is hereby incorporated by reference.

Each of the data storage devices 330 can be a data storage server or other system that can store data. The data storage device 330 can be a rack mountable storage having multiple magazines or an array of disk drives contained in a bay or a cabinet. The magazines are individual disk drives that store particular sets of data. The magazines can be hot swappable, fully self-contained and have a predetermined data storage capacity. In one embodiment, each data storage device 330 may typically include more than one storage disk and the storage disks (not shown) may be organized into disk arrays in case of Redundant Array of Independent Disks (RAID)-based storage architecture. The data storage device 330 may be one or more discrete physical devices, e.g., disk drives, tape drives, etc. Alternately, the data storage device 330 may be a storage subsystem with more than one disk drives and a resident RAID controller. Additionally, the data storage device 330 may allow hot-swapping in the event of a disk failure. The data storage disks may implement magnetic, optical or any other method of storing high-volume data. Some examples of storage disks include CD ROMs, magnetic tapes, videodisks, etc. Protection from power failures may also be part of the data storage device architecture. In one embodiment, the controller 332 may manage storage redundancy built into the data storage device 330. The controller 332 may also be configured to manage data recovery in the event of a storage device hardware failure. The controller 332 may also issue appropriate recovery commands in the event of data volume rebuilding after the hardware failure. One or more RAID algorithms may also be used by the controller 332 to manage such data storage and recovery operations. In an alternative embodiment, the data storage device 330 may include a resident RAID controller (not shown). In this configuration, the control 332 may not need to perform RAID operations and may simply issue data transfer commands without specifying the RAID levels for data storage.

Figure 6:
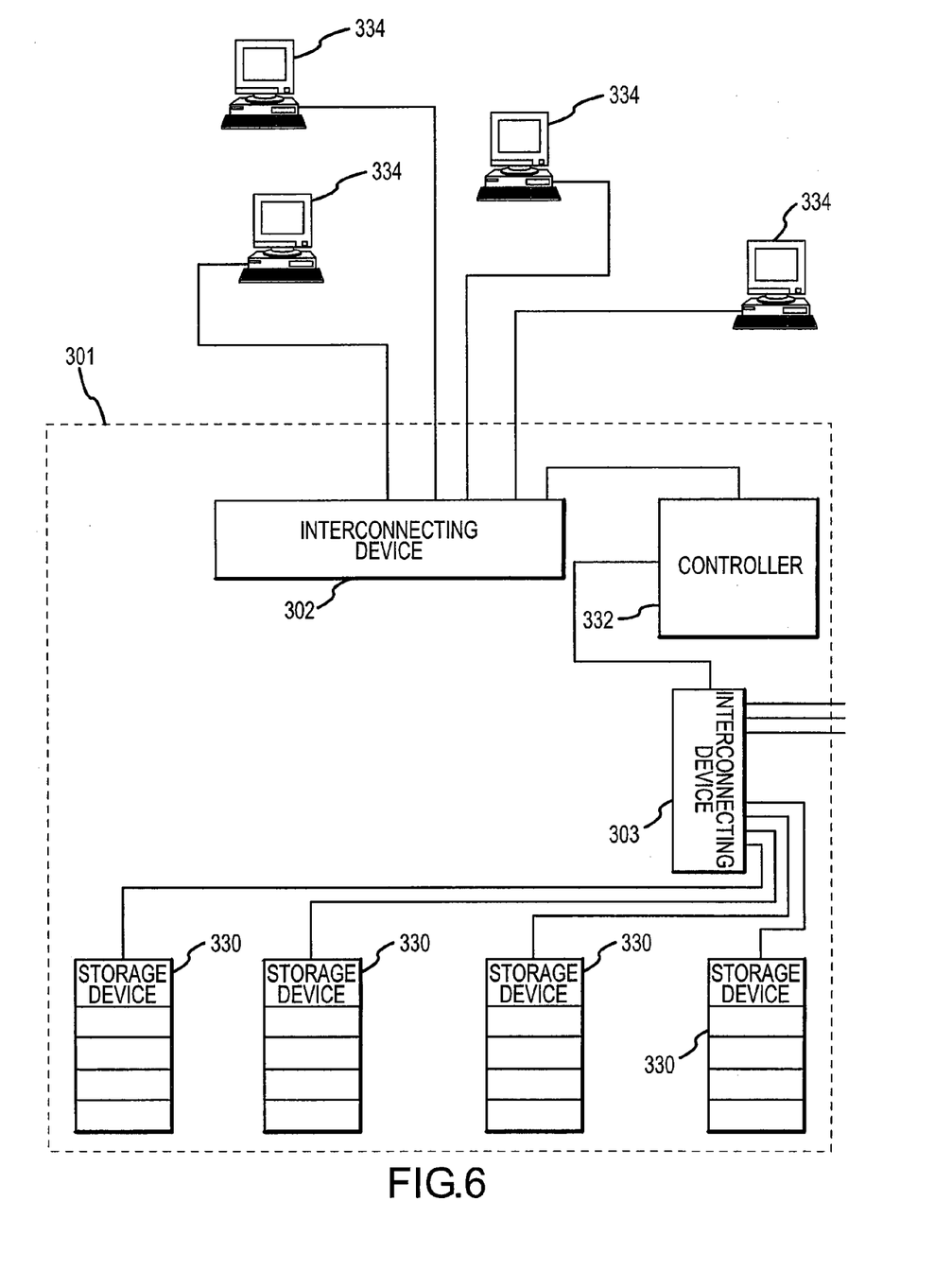
FIG. 6 illustrates another exemplary data processing system that incorporates exemplary interconnecting devices in accordance with exemplary embodiments of the present invention.

FIG. 6 illustrates another exemplary embodiment of a data processing system 301. The data processing system 301 is similar to the data processing system 300 described above except that an additional interconnecting device 303, which is also similar to the interconnecting device 302, is included.

Thus, the data processing system 301 incorporates or integrates the interconnecting device 302 and the interconnecting device 303, both of which has connections wherein some of which are physically restricted as previously described. Similar to the data processing system 300, the data processing system 301 can be a data storage system, a data storage rack, a data storage network, or other data processing systems involving in data transfers. The data processing system 301 comprises at least one data storage device 330 and as illustrated in FIG. 6, four data storage devices 330 are included. In one embodiment, the data processing system 300 also includes a controller 332, which manages data transfers within and/or from the data processing system 300.

The data processing system 301 is similar to the data processing system 300 with the following additions. The interconnecting device 302 allows for host computers or workstations 334 to connect to the data processing system 300. Additionally, the interconnecting device 302 also allows for other external components of the data processing system 300 (e.g., another data storage device, not shown), to be connected to the data processing system 300. The interconnecting device 303 allows for internal components of the data processing system 300 (e.g., the data storage devices 330 and the controller 332) to be connected to the data processing system 300. The interconnecting device 303 also connects the internal components such as the data storage devices 330 to the controller 332. Additionally, the interconnecting device 303 also allows for additional external components to be connected into the data processing system 301.

Figure 7:
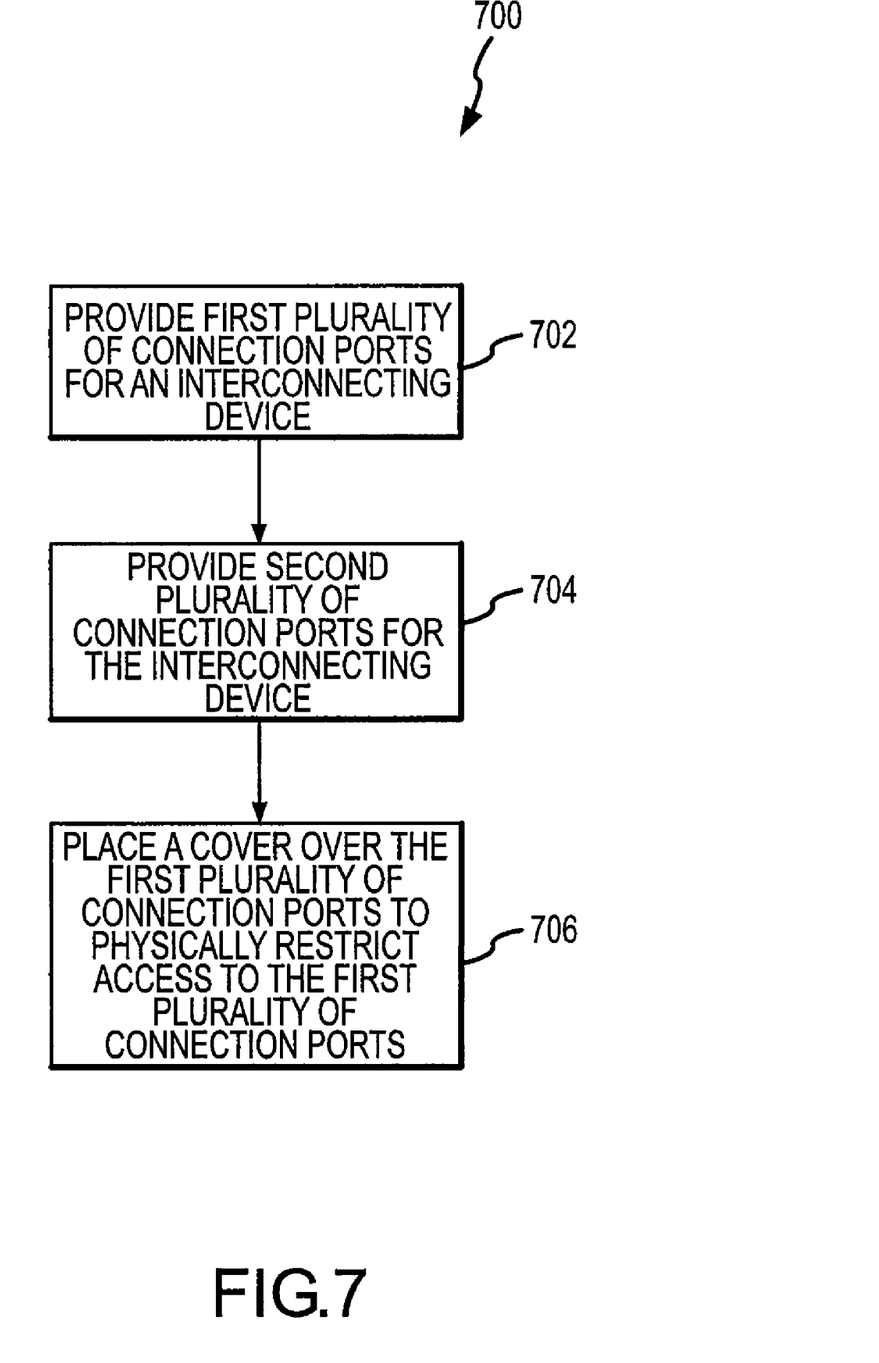
FIG. 7 illustrates an exemplary method of physically restricting access to an interconnecting device.

FIG. 7 illustrates an exemplary method 700 of restricting access to an interconnecting device that can be incorporated into a data processing system as previously described. At operation 702, the interconnecting device is configured or provided with a first plurality of connections ports as previously described. The number of first connection ports may be varied depending on needs and applications, and the first connection ports can be anywhere from one to more than one ports. At operation 704, the interconnecting device is configured or provided with a second plurality of connections ports as previously described. The number of second connection ports may be varied depending on needs and applications, and the second connection ports can be anywhere from one to more than one ports. At operation 706, a cover is placed over the first plurality of connection ports to physically restrict access to the first plurality of connection ports as previously described.

Figure 8:
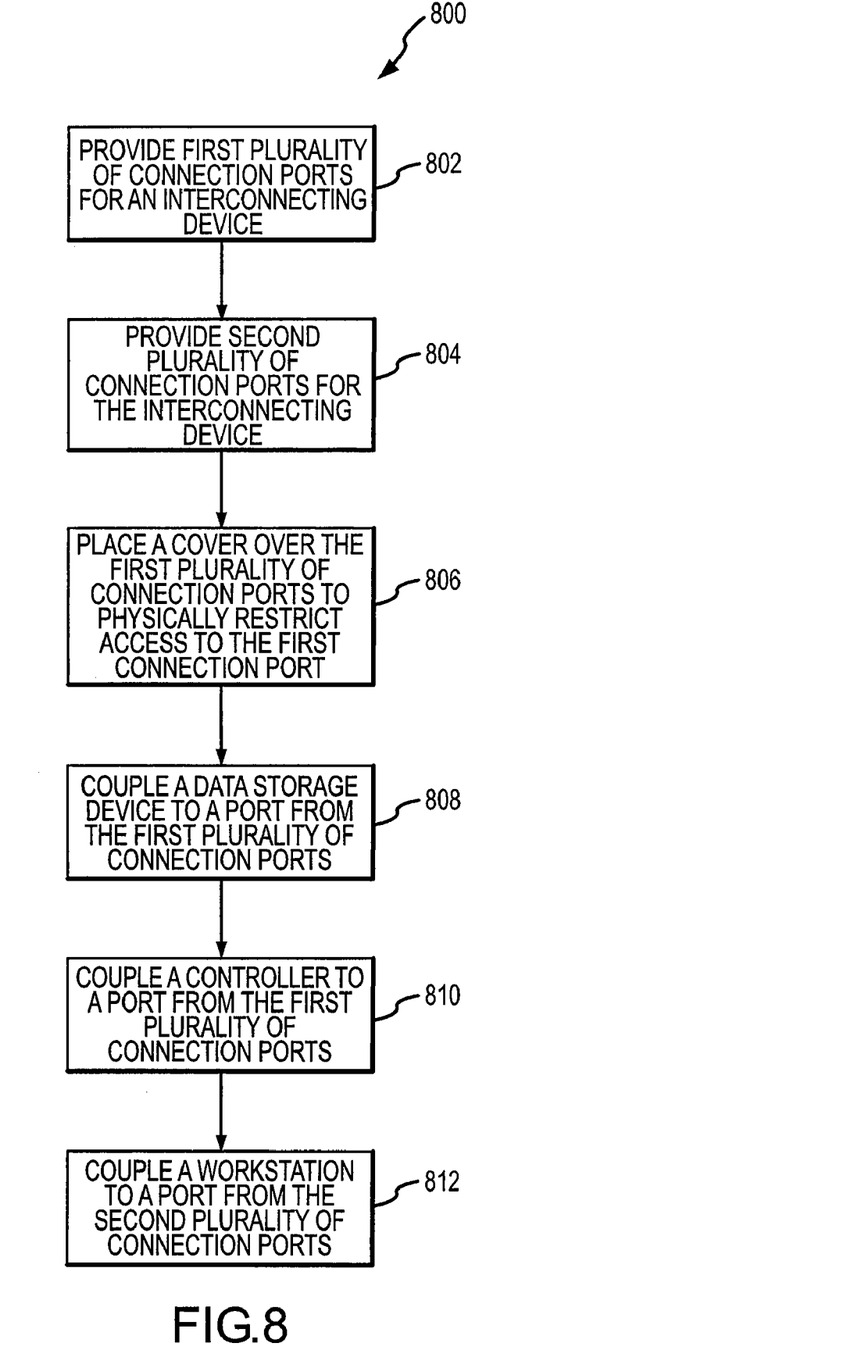
FIG. 8 illustrates an exemplary method of physically restricting access to an interconnecting device that is incorporated into a data storage network.

FIG. 8 illustrates an exemplary method 800 of restricting access to an interconnecting device that is incorporated into a storage network as previously described. At operation 802, the interconnecting device is configured or provided with a first plurality of connections ports as previously described. The number of first connection ports may be varied depending on needs and applications, and the first connection ports can be anywhere from one to more than one ports. At operation 804, the interconnecting device is configured or provided with a second plurality of connections ports as previously described. The number of second connection ports may be varied depending on needs and applications, and the second connection ports can be anywhere from one to more than one ports. At operation 806, a cover is placed over the first plurality of connection ports to physically restrict access to the first plurality of connection ports as previously described. At operation 808, a data storage device as previously described is coupled to one of the first plurality of connection ports. At operation 810, a controller as previously described is coupled to one of the first plurality of connection ports. And, at operation 812, a workstation as previously described is coupled to one of the second plurality of connection ports. The numbers of the data storage device, the workstation, the interconnecting device, and the controller can be varied depending on the need of the data storage network.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art

We claim:

1. An interconnecting device for a data processing system comprising:
    a first plurality of connection ports for connecting to first components of said data processing system;
    a second plurality of connection ports for connecting to second components of said data processing system; and
    a cover placed over said first plurality of connection ports to restrict access to said first plurality of connection ports.

2. The interconnecting device as in claim 1 wherein said interconnecting device is selected from a group consisting of a router, a switch router, a switch, a hub, a Fibre Channel switch, and a Fibre Channel hub.

3. The interconnecting device as in claim 1 wherein said data processing system is a data storage network.

4. The interconnecting device as in claim 1 wherein said first components comprise at least one of data storage devices, data storage servers, and data storage controller devices and wherein said cover is removable.

5. The interconnecting device as in claim 1 wherein said second components comprise at least one of workstations, host data processing systems, data storage devices, and client data processing systems.

6. The interconnecting device as in claim 1 further comprises a controller interconnected to one of said first plurality of connection ports, said controller manages data transfers at least one of within said data processing system, to said data processing system, and from said data processing system.

7. The interconnecting device as in claim 1 wherein said first plurality of connection ports and said second plurality of connections ports are located on one side of said interconnecting device.

8. The interconnecting device as in claim 1 wherein said first plurality of connection ports and said second plurality of connection ports are located on the side of said data processing system that faces the external environment of said data processing system.

9. The interconnecting device as in claim 1 wherein said data processing system is constrained in a housing wherein said second components are external components located externally to said housing and wherein said first components are internal components located within said housing.

10. A storage network comprising:
    an interconnecting device having a first plurality of connection ports and a second plurality of connection ports, wherein a cover is placed over said first plurality of connection ports to restrict access to said first plurality of connection ports;
    at least one data storage device, said at least data storage device coupled to one of said first plurality of connection ports; and
    wherein data are transferred between said at least one data storage device and at least one workstation via said interconnecting device, wherein said at least one workstation is connectable to one of said second plurality of connection ports.

11. The storage network as in claim 10 wherein said interconnecting device is selected from a group consisting of a router, a switch router, a switch, a hub, a Fibre Channel switch, and a Fibre Channel hub.

12. The storage network as in claim 10 further comprising a controller interconnected to one of said first plurality of ports, said controller manages data transfers at least one of within said storage network, to said storage network, and from said storage network.

13. The storage network as in claim 10 wherein said first plurality of connection ports and said second plurality of connections ports are located on one side of said interconnecting device.

14. The storage network as in claim 10 wherein said at least one data storage device and said interconnecting device are contained within a housing wherein said first plurality of connection ports and said second plurality of connections ports are located on one side of said interconnecting device, wherein only said second plurality of connection ports are exposed, and wherein said cover physically restrict access to said first plurality of connection ports.

15. A storage system comprising:
    a switch having a first plurality of connection ports and a second plurality of connection ports, wherein a cover is affixed over said first plurality of connection ports to restrict access to said first plurality of connection ports;
    a controller interconnected to one of said first plurality of connection ports;
    at least one data storage device, said at least data storage device interconnected to another of said first plurality of connection ports; and
    wherein said switch is configured to transfer data between said at least one data storage device and at least one workstation connectable to one of said second plurality of connection ports, and wherein said storage controller is configured to manage at least one of storage of data and transfer of data within said storage system.

16. The storage system as in claim 15 wherein said switch is a Fibre Channel switch.

17. The storage system as in claim 15 wherein said at least one data storage device said interconnecting device, and said controller are contained within a housing wherein said first plurality of connection ports and said second plurality of connections ports are located on one side of said interconnecting device, wherein only said second plurality of connection ports are exposed, and wherein said cover physically restricts access to said first plurality of connection ports.

18. A method of restricting access to an interconnecting device of a data processing system comprising:
    providing a first plurality of connection ports on said interconnecting device, said first plurality of connection ports allowing connection of said interconnecting device to first components of said data processing system;
    providing a second plurality of connection ports on said interconnecting device, said second plurality of connection ports allowing connection of said interconnecting device to second components of said data processing system; and
    placing a cover over said first plurality of connection ports to physically restrict access to said first plurality of connection ports, wherein said interconnecting device is configured to transfer data between said first components and second components of said data processing system.

19. The method of claim 18 wherein said internal components comprise at least one of a controller and a data storage device.

20. The method of claim 18 wherein said external components comprise at least one of workstations, host data processing systems and client data processing systems.

21. The method of claim 18 wherein said data processing system is constrained in a housing wherein said second components are external components located externally to said housing and wherein said first components are internal components located within said housing.

22. A method of restricting access to an interconnecting device of a storage network comprising:

providing an interconnecting device having a first plurality of connection ports and a second plurality of connection ports;

placing a cover over said first plurality of connection ports to physically restrict access to said first plurality of connection ports;

coupling at least one data storage device to one of said first plurality of connection ports; and wherein data are transferred between said at least one data storage device and at least one workstation via said interconnecting device, said at least one workstation is connectable to one of said second plurality of connection ports.

23. The method of claim 22 further comprising:

coupling a controller to said another of said first plurality of connection ports wherein said controller is configured to manage data transfer between said at least one data storage device and said at least one workstation.

24. An interconnecting device for a data processing system comprising:

a first connection port for connecting to a first component of said data processing system;

a second connection port for connecting to a second component of said data processing system; and a cover placed over said first connection port to physically restrict access to said first connection port.

25. A storage network comprising:

an interconnecting device having a first connection port and a second connection port, wherein a cover is placed over said first connection port to restrict access to said first connection port;

at least one data storage device, said at least data storage device coupled to said first connection port; and wherein data are transferred between said at least one data storage device and at least one workstation via said interconnecting device, said at least one workstation connectable to said second connection port.

* * * * *